(12) United States Patent  
Wang et al.

(10) Patent No.: US 11,789,140 B2
(45) Date of Patent: Oct. 17, 2023

(54) RADAR ANTENNA ARRAY, MOBILE USER EQUIPMENT, AND METHOD AND DEVICE FOR IDENTIFYING GESTURE

(71) Applicant: BEIJING XIAOMI MOBILE SOFTWARE CO., LTD., Beijing (CN)

(72) Inventors: Wei Wang, Beijing (CN); Chin-lung Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 631 days.

(21) Appl. No.: 17/025,728

(22) Filed: Sep. 18, 2020

(65) Prior Publication Data

US 2021/0311180 A1  Oct. 7, 2021

(30) Foreign Application Priority Data

Apr. 7, 2020 (CN) .......................... 202010264983.5

(51) Int. Cl.
*G01S 13/62* (2006.01)
*H01Q 1/24* (2006.01)
(Continued)

(52) U.S. Cl.
CPC ............. *G01S 13/62* (2013.01); *H01Q 1/24* (2013.01); *H01Q 21/065* (2013.01); *H01Q 21/08* (2013.01); *G06V 40/28* (2022.01)

(58) Field of Classification Search
CPC ......... G06V 40/28; G06F 3/017; G01S 13/62; H01Q 1/24; H01Q 21/065; H01Q 21/08
See application file for complete search history.

(56) References Cited

U.S. PATENT DOCUMENTS

| | | | | |
|---|---|---|---|---|
| 8,823,581 B2 * | 9/2014 | Mostov | ................. | G01V 8/005 |
| | | | | 342/55 |
| 9,000,973 B2 * | 4/2015 | Hyde | ..................... | G01S 7/412 |
| | | | | 342/28 |

(Continued)

FOREIGN PATENT DOCUMENTS

| | | |
|---|---|---|
| CN | 106054156 A | 10/2016 |
| CN | 109507653 A | 3/2019 |
| CN | 110765974 A | 2/2020 |

OTHER PUBLICATIONS

Extended European Search Report in the European Application No. 20197525.7, dated Mar. 11, 2021, (13p).

(Continued)

*Primary Examiner* — Peter M Bythrow
(74) *Attorney, Agent, or Firm* — Arch & Lake LLP

(57) ABSTRACT

Methods, apparatuses, and non-transitory computer-readable storage mediums are provided for identifying gesture. A radar antenna array applied to mobile User Equipment (UE) includes a transmit (Tx) antenna array located on a horizontal line and configured to transmit radar waves and a receive (Rx) antenna array including horizontal Rx antennae arranged along a horizontal dimension and/or pitch Rx antennae arranged along a pitch dimension. The horizontal dimension and the pitch dimension are perpendicular to each other. The Rx antenna array is configured to receive echoes caused by reflection of the radar waves. The horizontal Rx antennae are located on the horizontal line where the Tx antenna array is located. The pitch dimension is perpendicular to the horizontal line. A transmitting parameter for transmitting the radar waves and a receiving parameter for receiving the echoes are used at least for identifying a gesture within a radiation range.

19 Claims, 5 Drawing Sheets

(51) Int. Cl.
  *H01Q 21/06* (2006.01)
  *H01Q 21/08* (2006.01)
  *G06V 40/20* (2022.01)

(56) References Cited

U.S. PATENT DOCUMENTS

| | | | |
|---|---|---|---|
| 9,335,407 B2* | 5/2016 | Bowring | G01S 7/412 |
| 10,310,621 B1* | 6/2019 | Lien | G01S 7/412 |
| 10,481,696 B2* | 11/2019 | Molchanov | B60R 11/04 |
| 10,705,185 B1* | 7/2020 | Lien | G01S 7/412 |
| 10,749,272 B2* | 8/2020 | Wu | H01Q 21/24 |
| 10,772,511 B2* | 9/2020 | Sahin | G06V 40/28 |
| 11,165,169 B2* | 11/2021 | Kim | H01Q 21/08 |
| 11,169,644 B2* | 11/2021 | Kim | H01Q 1/22 |
| 11,194,031 B2* | 12/2021 | Sahin | H01Q 3/34 |
| 2011/0181510 A1* | 7/2011 | Hakala | G06F 3/017 |
| | | | 345/158 |
| 2011/0298670 A1* | 12/2011 | Jung | H01Q 1/243 |
| | | | 343/702 |
| 2014/0368378 A1* | 12/2014 | Crain | G01S 13/767 |
| | | | 342/25 A |
| 2016/0285172 A1* | 9/2016 | Kishigami | G01S 7/023 |
| 2017/0336497 A1* | 11/2017 | Jungmaier | G01S 7/35 |
| 2018/0062256 A1* | 3/2018 | Kim | H01Q 13/085 |
| 2018/0248254 A1* | 8/2018 | Islam | H01Q 19/13 |
| 2019/0058264 A1* | 2/2019 | Jung | H01Q 9/0435 |
| 2019/0219687 A1* | 7/2019 | Baheti | G01S 7/415 |
| 2019/0293753 A1* | 9/2019 | Iwasa | G01S 7/2813 |
| 2020/0026360 A1* | 1/2020 | Baheti | G06F 3/0416 |
| 2020/0026361 A1* | 1/2020 | Baheti | G01S 13/06 |
| 2020/0057504 A1* | 2/2020 | Lien | G01S 7/352 |
| 2020/0125158 A1* | 4/2020 | Giusti | G01S 13/04 |
| 2020/0127387 A1* | 4/2020 | Park | H01Q 9/0414 |
| 2020/0194904 A1* | 6/2020 | Huh | H01Q 21/24 |
| 2020/0280120 A1* | 9/2020 | Niakan | H01Q 21/28 |
| 2020/0355817 A1* | 11/2020 | Gillian | G06N 3/08 |
| 2020/0408876 A1* | 12/2020 | Weber | G01S 7/415 |
| 2021/0239788 A1* | 8/2021 | Arage | G01S 7/032 |
| 2023/0059603 A1* | 2/2023 | Woo | H01Q 1/48 |
| 2023/0161027 A1* | 5/2023 | Amihood | G01S 7/023 |
| | | | 342/109 |

OTHER PUBLICATIONS

Lien, Jaime, et al., "Soli: Ubiquitous Gesture Sensing with Millimeter Wave Radar", ACM Transactions On Graphics, ACM, NY, US, vol. 35, No. 4, Jul. 11, 2016, (19p).

Zhao Wangyu et al., "Vehicle Detection and Tracking Based on Fusion of Millimeter Wave Radar and Monocular Vision", <Geomatics and Information Science of Wuhan University>, vol. 44 No. 12, Dec. 5, 2019.DOI: 10.13203/j.whugis20180146. 9 pages with English translation.

* cited by examiner

RADAR ANTENNA ARRAY, MOBILE USER EQUIPMENT, AND METHOD AND DEVICE FOR IDENTIFYING GESTURE

CROSS-REFERENCE TO RELATED APPLICATION

This application is based on, and claims the priority of Chinese Application No. 202010264983.5 filed on Apr. 7, 2020, the entire contents of which are incorporated herein by reference in its entirety for all purposes.

TECHNICAL FIELD

The present disclosure relates to the field of mobile control, and more particularly to a method and device for identifying a gesture.

BACKGROUND

In order to identify a gesture through a mobile phone, a radar sensor may have to be installed in the mobile phone. There may be a limited number and limited layouts of antennae in a radar sensor installed in an existing mobile phone. Consequently, only one target object may be detected at a time, with poor angular resolution. In a scene of identifying a gesture, a single wave in an arbitrary direction no longer meets a demand of a user. A more complex gesture may have to be implemented through coordinated motion of multiple fingers. In such a case, existence of multiple target objects makes it impossible to implement accurate detection, leading to a low rate of gesture identification.

SUMMARY

In view of this, the present disclosure relates to the field of mobile control. Embodiments herein provide a radar antenna array, mobile User Equipment (UE), and a method and device for identifying a gesture.

According to a first aspect of the present disclosure, a radar antenna array applied to mobile User Equipment (UE) is provided. The radar antenna array may include a transmit (Tx) antenna array located on a horizontal line and configured to transmit radar waves, and a receive (Rx) antenna array that may include horizontal Rx antennae arranged along a horizontal dimension and/or pitch Rx antennae arranged along a pitch dimension. The horizontal dimension and the pitch dimension may be perpendicular to each other. The Rx antenna array may be configured to receive echoes caused by reflection of the radar waves. The horizontal Rx antennae may be located on the horizontal line where the Tx antenna array is located. The pitch dimension may be perpendicular to the horizontal line. A transmitting parameter for transmitting the radar waves and a receiving parameter for receiving the echoes may be used at least for identifying a gesture within a radiation range covered by the radar waves.

According to a second aspect of the present disclosure, mobile User Equipment (UE) is provided. The mobile UE may include a transmit (Tx) antenna array located on a horizontal line and configured to transmit radar waves, a receive (Rx) antenna array comprising horizontal Rx antennae arranged along a horizontal dimension and/or pitch Rx antennae arranged along a pitch dimension, and a processing circuit connected to the Tx antenna array and the Rx antenna array in a radar antenna array. The horizontal dimension and the pitch dimension are perpendicular to each other. The Rx antenna array may be configured to receive echoes caused by reflection of the radar waves. The horizontal Rx antennae may be located on the horizontal line where the Tx antenna array is located. The pitch dimension may be perpendicular to the horizontal line. A transmitting parameter for transmitting the radar waves and a receiving parameter for receiving the echoes may be used at least for identifying a gesture within a radiation range covered by the radar waves. The processing circuit may be configured to determine, based on the transmitting parameter for transmitting the radar waves by the Tx antenna array and the receiving parameter for receiving the echoes by the Rx antenna array, a relative motion parameter for motion of target objects relative to the mobile UE. The processing circuit may further be configured to acquire a clustering result by performing clustering association on the target objects based on the relative motion parameter. The processing circuit may be configured to acquire the relative motion parameter for a second-type object of the target objects that has moved by filtering out a first-type object of the target objects that has not moved according to the clustering result. The processing circuit may additionally be configured to acquire a gesture identification result by performing machine learning on the relative motion parameter for the second-type object through a preset gesture identification model.

According to a third aspect of the present disclosure, a method for identifying a gesture applied to mobile User Equipment (UE) is provided. The method may include controlling Tx antennae in the mobile UE to transmit radar waves. The method may further include controlling Rx antennae in the mobile UE to receive echoes caused by reflection of the radar waves. The method may include determining, based on a transmitting parameter for transmitting the radar waves and a receiving parameter for receiving the echoes, a relative motion parameter for motion of target objects relative to the mobile UE. The method may additionally include acquiring a clustering result by performing clustering association on the target objects based on the relative motion parameter. The method may also include acquiring the relative motion parameter for a second-type object of the target objects that has moved by filtering out a first-type object of the target objects that has not moved according to the clustering result. The method may include acquiring a gesture identification result by performing machine learning on the relative motion parameter for the second-type object through a preset gesture identification model.

According to a fourth aspect of the present disclosure, a computing device is provided. The computing device may include one or more processors, a non-transitory computer-readable memory storing instructions executable by the one or more processors. The one or more processors may be configured to control Tx antennae in mobile User Equipment (UE) to transmit radar waves. The one or more processors may further be configured to control Rx antennae in the mobile UE to receive echoes caused by reflection of the radar waves. The one or more processors may further be configured to determine, based on a transmitting parameter for transmitting the radar waves and a receiving parameter for receiving the echoes, a relative motion parameter for motion of target objects relative to the mobile UE. The one or more processors may further be configured to acquire a clustering result by performing clustering association on the target objects based on the relative motion parameter. The one or more processors may further be configured to acquire the relative motion parameter for a second-type object of the target objects that has moved by filtering out a first-type object of the target objects that has not moved according to the clustering result. The one or more processors may further be configured to acquire a gesture identification result by performing machine learning on the relative motion parameter for the second-type object through a preset gesture identification model.

The above general description and detailed description below are but examples and explanatory, and do not limit the subject disclosure.

BRIEF DESCRIPTION OF THE DRAWINGS

The accompanying drawings, which are incorporated in and constitute part of the subject disclosure, illustrate embodiments according to the present disclosure, and together with the description, serve to explain the principle of the disclosure.

DETAILED DESCRIPTION

Figure 1:
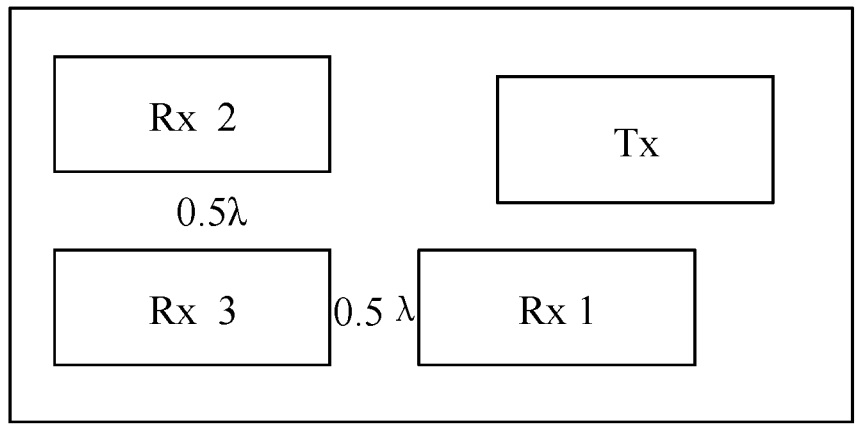
FIG. 1 is a diagram of an antenna array of a radar sensor including 1 transmit (Tx) antenna and 3 receive (Rx) antennae, according to an example of the present disclosure.

Example embodiments (examples of which are illustrated in the accompanying drawings) are elaborated in detail below. The following description may refer to the accompanying drawings, in which identical or similar elements in two drawings are denoted by identical reference numerals unless indicated otherwise. Implementations set forth in the following embodiments do not represent all implementations in accordance with the subject disclosure. Rather, they are mere examples of the apparatus (i.e., device/equipment/terminal) and method in accordance with certain aspects of the subject disclosure as recited in the accompanying claims. The example implementation modes may take on multiple forms, and should not be taken as being limited to examples illustrated herein. Instead, by providing such implementation modes, embodiments herein may become more comprehensive and complete, and comprehensive concept of the example implementation modes may be delivered to those skilled in the art. Implementations set forth in the following embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical improvements of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

Mobile User Equipment (UE) such as a mobile phone may be provided with a radar system including one Tx antenna and multiple Rx antennae, providing a simple gesture identification function. FIG. 1 is a diagram of an antenna array of a radar sensor including 1 transmit (Tx) antenna and 3 receive (Rx) antennae (Rx1, Rx2, and Rx3). As shown in FIG. 1, in the radar sensor, there are 1 Tx antenna (Tx), two Rx antennae (Rx1, Rx3) arranged along a horizontal dimension, and two Rx antennae (Rx2, Rx3) arranged along a pitch dimension. A spacing between two Rx antennae is half a wavelength of a radar wave. An angular resolution achieved by an aperture formed by such an antenna array is poor. The radar can identify a wave of a palm, etc., only, but cannot identify a small target object such as a finger. In addition, as the radar has only two Rx antennae in one dimension, the radar can detect one target object only, but not coordinated motion, such as of multiple fingers, for example.

Accordingly, to improve an angular resolution of a radar sensor, an aperture of an antenna array may be increased by increasing a number of antenna array elements in the antenna array, thereby improving the angular resolution of the radar. However, increasing only the number of antennae may increase complexity of the system and cost of production. Moreover, increasing the number of the antenna array elements may greatly increase the size of the radar sensor, impacting layout of another device in the mobile phone.

Figure 2:
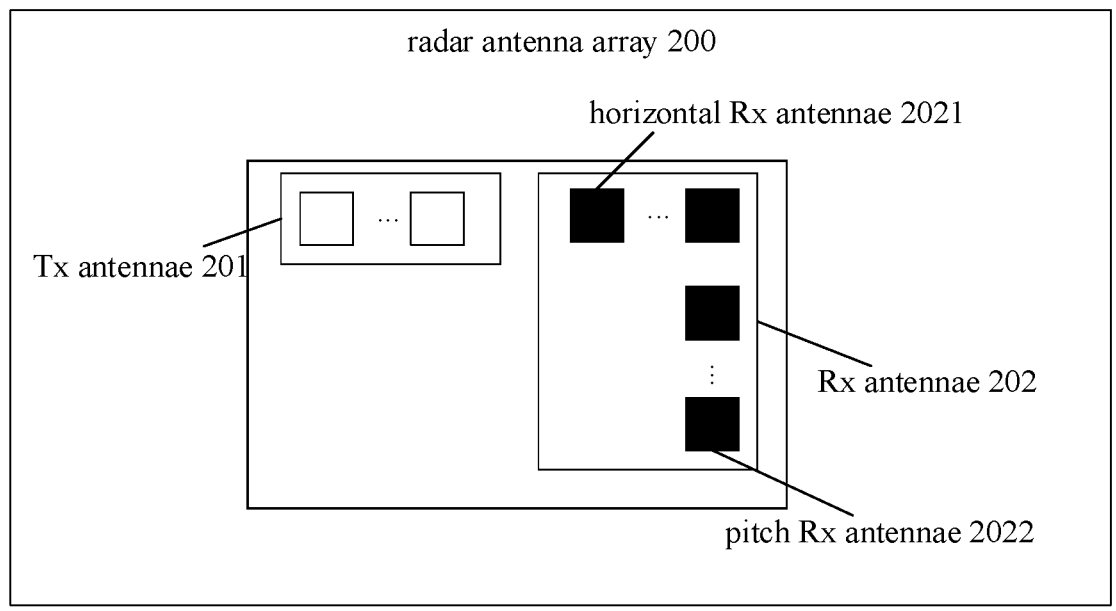
FIG. 2 is a diagram of a structure of a radar antenna array, according to an example of the present disclosure.

In one or more embodiments herein provided, a radar antenna array may implement accurate detection of multiple target objects without excessively increasing the size of a radar sensor. FIG. 2 is a diagram of a structure of a radar antenna array according to an embodiment. As shown in FIG. 2, the radar antenna array 200 includes transmit (Tx) antennae 201 and receive (Rx) antennae 202. The Tx antennae, for example, may be a Tx antennae array. The Rx antennae, for example, may be a Rx antennae array.

The Tx antennae 201 are located on one horizontal line. The Tx antennae are adapted to transmit radar waves.

The Rx antennae 202 are adapted to receiving echoes caused by reflection of the radar waves.

The Rx antennae 202 include horizontal Rx antennae 2021 arranged along a horizontal dimension and/or pitch Rx antennae 2022 arranged along a pitch dimension. The horizontal dimension and the pitch dimension are perpendicular to each other. The horizontal Rx antennae 2021 are located on the one horizontal line where the Tx antennae 201 are located. The pitch dimension along which the pitch Rx antennae 2022 may be arranged is perpendicular to the one horizontal line on which the horizontal Rx antennae 2021 are located. A transmitting parameter for transmitting the radar waves and a receiving parameter for receiving the echoes are used at least for identifying a gesture within a radiation range covered by the radar waves.

In FIG. 2, a white block may represent a Tx antenna. A black block may represent a Rx antenna.

The radar antenna array may be integrated inside a radar sensor. The radar antenna array may include multiple Tx antennae adapted to transmitting radar waves and multiple Rx antennae adapted to receiving echoes caused by reflection of the radar waves.

Note that an angular resolution achievable by an radar antenna array is proportional to an aperture of the radar antenna array. That is, the greater the aperture of the radar antenna array is, the higher the angular resolution. A most straightforward way to increase the aperture is to increase the number of antenna array elements, or the number of antennae in the radar antenna array. However, in practice, increasing the aperture just by increasing the number of antennae may increase hardware cost, as well as impacting layout.

In view of this, embodiments herein propose a radar antenna array capable of implementing, using a small number of antennae, an angular resolution achievable by more antennae in related art.

The radar antenna array may be a Multiple Input Multiple Output (MIMO) radar antenna array. The MIMO radar antenna array may simultaneously transmit radar waves of orthogonal waveforms through multiple Tx antennae. Each two signals formed by multiple radar waves may be orthogonal to each other, thereby implementing independent radar waves of respective transmission channels. The radar waves transmitted by the Tx antennae may be reflected by a target object and then received by the Rx antennae. Since each Rx antenna may receive the radar waves transmitted by the respective Tx antennae, echo data of M*N channels may be acquired in the end. Herein, M is the number of the Tx antennae, N is the number of the Rx antennae. Both M and N may be greater than 1.

As M*N is no less than the sum of M and N, the MIMO radar antenna array may achieve a transmission capacity higher than a transmission capacity of M+N physical antenna array elements.

As an example, if the MIMO radar antenna array consists of 2 Tx antennae and 4 Rx antennae, as each Rx antenna may receive echoes caused by reflection of radar waves transmitted by all the Tx antennae, each Rx antenna on the Rx antenna side may receive echoes caused by reflection of radar waves transmitted by the 2 Tx antennae. Then, echo data of 8 channels may be acquired, which is equivalent to a transmission capacity achieved by a common evenly spaced antenna array consisting of 1 Tx antenna and 8 Rx antennae. Herein, the transmission capacity may be a multiple of a transmission capacity achieved by 4 physical Rx antenna array elements.

Accordingly, compared to a structure of one Tx antenna and multiple Rx antennae, with embodiments herein, multiple Rx antennae and multiple Tx antennae may be arranged, increasing layers of information received, thereby achieving a higher angular resolution based on increased information, implementing finer detection. Moreover, a transmission capacity same as that achieved by more antennae (such as 1 Tx antenna and 8 Rx antennae) may be achieved by less antennae (such as 2 Tx antennae and 4 Rx antennae), thereby saving hardware cost, as well as facilitating subsequent device layout.

Herein, a relative motion parameter for motion of target objects relative to the mobile UE is determined based on a transmitting parameter for transmitting the radar waves and a receiving parameter for receiving the echoes. A gesture may be determined by processing the relative motion parameter, such as by performing clustering association on the target objects to classify the target objects as different clusters, then filtering out a first-type object of the target objects that has not moved, and performing identification processing on a relative motion parameter for a second-type object of the target objects that has moved based on a gesture identification model. A target object may be a palm, a finger, etc.

Furthermore, multiple Tx antennae may be placed on one horizontal line. Rx antennae may be placed as two parts. One part of the Rx antennae may be placed on the one horizontal line where the Tx antennae are located, and may be referred to as horizontal Rx antennae that may be arranged along the horizontal dimension. The other part of the Rx antennae may be placed along a pitch dimension perpendicular to the one horizontal line where the Tx antennae are located, and may be referred to as pitch Rx antennae.

Herein, the horizontal Rx antennae may refer to Rx antennae located on one horizontal line. The pitch Rx antennae may refer to a line of Rx antennae perpendicular to the one horizontal line.

Since the horizontal dimension and the pitch dimension are perpendicular to each other, the line of the pitch Rx antennae may be perpendicular to the one horizontal line where the horizontal Rx antenna are located.

With embodiments herein, Rx antennae may be arranged as horizontal Rx antennae and pitch Rx antennae. It is ensured, through spatial separation, that the horizontal Rx antennae and the pitch Rx antennae receive radar waves on different paths, respectively, while meeting a requirement of antenna separation.

In the radar antenna array, a distance between two adjacent Tx antennae of the Tx antennae may be half a wavelength of the radar waves. A distance between two adjacent horizontal Rx antennae may be the wavelength of the radar waves. A distance between two adjacent pitch Rx antennae may be half the wavelength of the radar waves.

In general, mobile UE may implement, based on a radar sensor, near field detection such as detection of a gesture. A palm may scatter a wave in a near field. A radar wave reflected by the palm may scatter in various directions and arrive at a Rx antenna. Given that there may be a number of near-field scattering objects around mobile UE, it is generally deemed enough to arrange antenna array elements with a spacing of half the wavelength of the radar wave or more in order to render correlation or interference between signals weak enough.

Accordingly, for meeting a layout requirement and reducing an occupied space as much as possible, herein, a distance between two adjacent Tx antennae of the Tx antennae may be set as half a wavelength of a radar wave. A distance between two adjacent pitch Rx antennae may also be set as half the wavelength of the radar wave.

Give that only a motion parameter for one target object may be detected if there are only two Rx antennae arranged along one dimension, the number of Rx antennae arranged along each dimension has to be increased in order to allow multiple target objects to be detected. Given that an MIMO radar antenna array can produce more equivalent virtual antennae, a reduced number of antennae arranged along one dimension with increased spacing may be equivalent to more virtual antennae, thereby detecting multiple target objects. Therefore, combining a layout demand, according to one or more embodiments herein, a distance between two adjacent horizontal Rx antennae may be set as the wavelength of the radar wave. Then, when the second Tx antenna is arranged away from the second Tx antenna by half the wavelength of the radar wave, there may be an equivalent virtual horizontal Rx antenna between two horizontal Rx antennae with a spacing of the wavelength of the radar wave.

Note that there may be an arbitrary spacing between a Tx antenna and an adjacent horizontal Rx antenna located on one horizontal line. That is, the spacing is not limited herein. However, the spacing between a Tx antenna and an adjacent horizontal Rx antenna may be set to be as small as possible to save a layout space.

In this way, spacing among Tx antennae and various types of Rx antennae may be set to demand as little layout space as possible based on an inter-signal correlation requirement to achieve greater signal transmission capacity, thereby achieving a higher resolution, facilitating detection of multiple target objects.

The Tx antennae may be two Tx antennae. The horizontal Rx antennae may be two horizontal Rx antennae including an outermost horizontal Rx antenna. The pitch Rx antennae may be two adjacent pitch Rx antennae including a closer pitch Rx antenna. A distance between the outermost horizontal Rx antenna and the closer pitch Rx antenna may equal a distance between the two adjacent pitch Rx antennae. The outermost horizontal Rx antenna may be located at an outermost side of the one horizontal line. The outermost horizontal Rx antenna may be closer to the two adjacent pitch Rx antennae than the other horizontal Rx antenna is. The outermost horizontal Rx antenna may be located on one line as the two adjacent pitch Rx antennae. The outermost horizontal Rx antenna may be closer to the closer pitch Rx antenna than is to the other pitch Rx antenna.

Herein, the horizontal Rx antenna closer to the two adjacent pitch Rx antennae may be located on both the one horizontal line and the line perpendicular to the one horizontal line. That is, the horizontal Rx antenna located on both the one horizontal line and the line perpendicular to the one horizontal line may be deemed to be arranged along both the pitch dimension and the horizontal dimension.

Note that embodiments herein are illustrated with an example of an MIMO radar antenna array consisting of 2 Tx antennae and 4 Rx antennae. The actual number of Tx antennae and Rx antennae is not limited herein and may be adjusted as needed. In addition, spacing among the Tx antennae and the Rx antennae is also not limited as long as inter-signal correlation is small. That is, spacing among the Tx antennae and the Rx antennae may be no less than half the wavelength.

Figure 3:
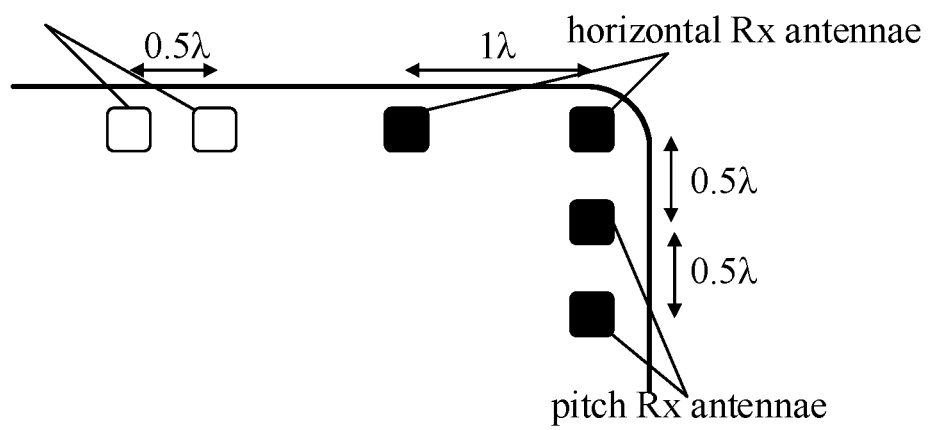
FIG. 3 is a diagram of a structure of a radar antenna array according to an example of the present disclosure.

FIG. 3 is a diagram of a structure of a radar antenna array according to an embodiment. As shown in FIG. 3, according to a layout design of the radar antenna array herein, 2 Tx antennae and 2 horizontal Rx antennae may be arranged on one horizontal line. Pitch Rx antennae may be arranged on a line perpendicular to the one horizontal line. In addition, the distance between the horizontal Rx antenna closest to the pitch Rx antennae and an adjacent pitch Rx antenna may be set to be half the wavelength of the radar wave. The distance between the two adjacent Tx antennae may be set as half the wavelength of the radar wave. The distance between the two adjacent pitch Rx antennae may also be set as half the wavelength of the radar wave.

As both Tx antennae and Rx antennae are arranged along the horizontal dimension, which produces a wide layout, as small a number of antennae as possible may have to be arranged along the horizontal dimension while ensuring detection of multiple target objects. Accordingly, 2 horizontal Rx antennae may be arranged, with the distance (i.e., spacing) between the 2 horizontal Rx antennae being set to be the wavelength.

It can be seen that with embodiments herein, it is ensured, through spatial separation, that the horizontal Rx antennae and the pitch Rx antennae receive radar waves on different paths, respectively, improving signal reliability. Spaced layout along the horizontal dimension not only reduces layout space occupied, but also implements detection of multiple target objects.

Figure 4:
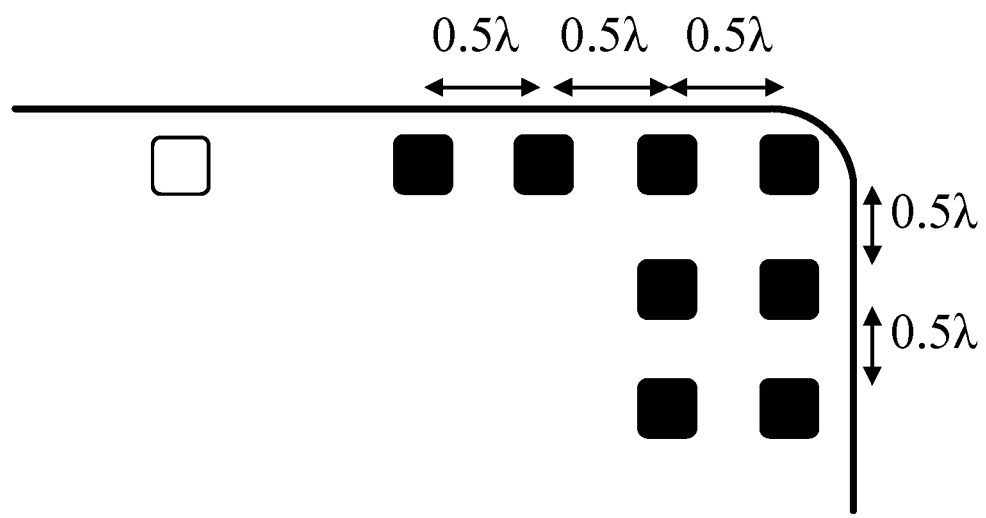
FIG. 4 is a diagram of a virtual array equivalent to a radar antenna array, according to an example of the present disclosure.

FIG. 4 is a diagram of a virtual array equivalent to a radar antenna array according to an embodiment. As shown in FIG. 4, the virtual array is a common evenly spaced antenna array including 1 Tx antenna and 8 Rx antennae. Spacing between any two adjacent Rx antennae of the 8 Rx antennae is half the wavelength. It can be seen from the above that, according to transmission characteristic of an MIMO radar antenna array, a transmission capacity of the virtual array may equal that of the MIMO radar antenna array consisting of the 2 Tx antennae and the 4 Rx antennae as shown in FIG. 3. Therefore, the MIMO radar antenna array consisting of the 2 Tx antennae and the 4 Rx antennae designed may achieve a transmission result identical to that achieved by 1 Tx antenna and 8 Rx antennae, reducing the number of antennae as well as hardware cost.

Accordingly, with embodiments herein, a radar antenna array applicable to mobile UE and including multiple Tx antennae and Rx antennae is provided. The Tx antennae may be arranged on one horizontal line and spaced by half a wavelength. The Rx antennae may be arranged as horizontal Rx antennae arranged along the horizontal dimension and pitch Rx antennae arranged along the pitch dimension. The horizontal Rx antennae may be located on the one horizontal line as the Tx antennae are. Spacing between the horizontal Rx antennae may set as the wavelength. Spacing between the pitch Rx antennae may set as half the wavelength. In this way, an aperture of the radar antenna array is increased by increasing the number of antennae, thereby improving an angular resolution. In addition, the radar antenna array may be equivalent to a virtual array with a greater aperture, thereby achieving, with less antennae, an increased angular resolution achievable by more antennae. More target objects may be detected more accurately with an increased angular resolution, thereby facilitating subsequent accurate gesture detection based on a radar sensor.

Figure 5:
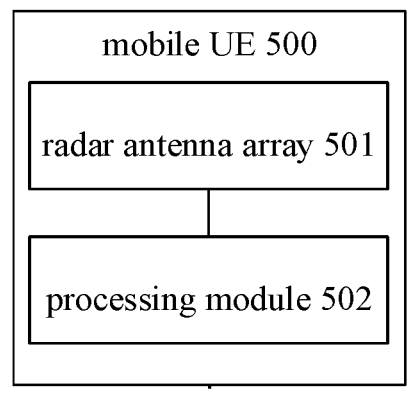
FIG. 5 is a diagram of a structure of mobile UE, according to an example of the present disclosure.

Embodiments herein also provide mobile UE for implementing accurate detection of multiple target objects without excessively increasing the size of a radar sensor. FIG. 5 is a diagram of a structure of mobile UE according to an embodiment. As shown in FIG. 5, the mobile UE 500 includes the radar antenna array 501 according to an aforementioned embodiment and a processing module 502.

The processing module 502 is connected to the Tx antennae and the Rx antennae in the radar antenna array 501. The processing module, for example, may be a processing circuit. The processing module, in another example, may be one or more processors. The processing module 502 is adapted to: determining, based on the transmitting parameter for transmitting the radar waves by the Tx antennae and the receiving parameter for receiving the echoes by the Rx antennae, a relative motion parameter for motion of target objects relative to the mobile UE; acquiring a clustering result by performing clustering association on the target objects based on the relative motion parameter; acquiring the relative motion parameter for a second-type object of the target objects that has moved by filtering out a first-type object of the target objects that has not moved according to the clustering result; and acquiring a gesture identification result by performing machine learning on the relative motion parameter for the second-type object through a preset gesture identification model.

Herein, elaboration of the radar antenna array has been made in an aforementioned embodiment, which is not repeated here.

The mobile UE may refer to any mobile electronic equipment, including a smart phone, a tablet computer, a notebook computer, a smart watch, etc. A radar sensor may be installed in the mobile UE. The radar sensor may include the radar antenna array consisting of multiple Tx antennae and Rx antennae. The radar antenna array may be adapted to transmitting radar waves and receiving echoes caused by reflection of the radar waves.

Herein, the radar antenna array may be arranged on a surface where a display of the mobile UE is located. Alternatively, the radar antenna array may be arranged on a surface opposite to the surface where the display is located, i.e., on the back of the mobile UE. Alternatively, the radar antenna array may be arranged on an end face (i.e., a side) of the display.

Application may differ depending on the location of the radar antenna array. For example, when the radar antenna array is arranged on the surface where the display is located, the radar antenna array may take up a small area of the display while meeting more application demands. When the radar antenna array is arranged on the surface opposite to the surface where the display is located, there is no impact on the area of the display, while meeting less application demands. When the radar antenna array is arranged on an end face of the display, there is no impact on the area of the display either, and a greater range may be covered than when it is on the back. However, the side arrangement may pose a certain requirement on a frame layout. Therefore, a location for installing the radar antenna array may be set as needed.

However, note that although the radar antenna array may take up a small area of the display when being arranged on the surface where the display is located, the radar antenna array can meet more application demands. With the radar antenna array proposed herein, an angular resolution may be greatly improved at a price of a small area being occupied. Therefore, a fair application result may be achieved by arranging the radar antenna array on the surface where the display is located based on an application demand and a layout consideration.

The processing module may include a processor adapted to sending various control instructions in the mobile UE and a peripheral circuit thereof.

After the radar waves are transmitted and the echoes are received, the processing module may acquire the transmitting parameter for transmitting the radar waves and the receiving parameter for receiving the echoes. The processing module may determine the relative motion parameter for motion of the target objects relative to the mobile UE based on the transmitting parameter and the receiving parameter. Then, the processing module may acquire a gesture identification result by performing a series of processing on the relative motion parameter.

Herein, with mobile UE provided with the radar antenna array according to an embodiment herein, more target objects may be detected more accurately with an increased angular resolution, facilitating accurate gesture detection.

The processing module may perform a series of processing on the relative motion parameter as follows. The relative motion parameter for motion of target objects relative to the mobile UE may be determined based on the transmitting parameter and the receiving parameter. A clustering result may be acquired by performing clustering association on the target objects based on the relative motion parameter. The relative motion parameter for a second-type object of the target objects that has moved may be acquired by filtering out a first-type object of the target objects that has not moved according to the clustering result. A gesture identification result may be acquired by performing machine learning on the relative motion parameter for the second-type object through a preset gesture identification model.

A gesture to be identified may include an operation gesture of a palm, an operation gesture of a finger, etc. The gesture may serve to unlock the mobile UE without touching the mobile UE. The gesture may serve to perform a control operation. The target object includes the palm or the finger.

A relative motion parameter may include at least one of a relative speed, a relative angle, a relative distance, etc. The relative speed may refer to a speed of motion of a target object relative to the mobile UE. The relative distance may refer to a straight-line distance of a target object to the mobile UE. The relative angle may refer to an angle of rotation formed by a target object with respect to the mobile UE.

Herein, by performing clustering association on the target objects, the target objects may be classified by clustering target objects in identical or similar states of motion together and considering target objects in one cluster as a whole. Target objects classified into one cluster are target objects in similar states of motion. A state of motion may be represented by a relative motion parameter. That is, if it is determined, based on the transmitting parameter and the receiving parameter, that target objects have identical relative motion parameters or relative motion parameters differing by an amount within a preset range, the target objects may be in identical or similar states of motion.

A first-type object may refer to a target object that has not moved. A second-type object may refer to a target object that has moved.

With embodiments herein, after the target objects are classified according to different states of motion, a target object that has moved and a target object that has not moved may be determined. Since a gesture is to be identified herein, a gesture may be generated only when a finger or a palm moves. Accordingly, herein a pair of trajectories of motion of second-type objects that have moved are to be identified to determine a gesture made by a user.

Therefore, during gesture identification, interfering data may be filtered out, and only a trajectory of motion of a second-type object that has moved may be identified, reducing difficulties in identification and complexity of computation, thereby improving accuracy in gesture identification.

Figure 6:
FIG. 6 is a gesture based on an index finger and a thumb, according to an example of the present disclosure.

Herein, target objects with similar relative distances and similar relative speeds may be deemed to be in similar states of motion, such as shown in FIG. 6. FIG. 6 is a gesture based on an index finger and a thumb. In FIG. 6, the thumb and the index finger may move with respect to each other, and get close to each other gradually. In such a gesture, relative distances and relative speeds of fingers other than the index finger and the thumb (such as the middle finger and the little finger) detected by a radar sensor may be identical. Then, a difference between the relative distance corresponding to the middle finger and the relative distance corresponding to the little finger may be very small. A difference between the relative speed corresponding to the middle finger and the relative speed corresponding to the little finger may also be very small. In such a case, it may be deemed that the fingers other than the index finger and the thumb are associated and belong to one cluster. In FIG. 6, the fingers other than the index finger and the thumb have not moved and thus may be interfering objects belonging to one cluster.

Therefore, by clustering association, the target objects may be classified according to associations, thereby rapidly distinguishing a target object to be identified from an interfering object, facilitating subsequent gesture identification.

A preset gesture identification model may refer to a machine learning model pre-stored in the mobile UE for gesture identification. The gesture identification model may be any neural network model capable of implementing identification, such as a Convolutional Neural Network (CNN), a Long Short-Term Memory network (LSTM) model, etc. Herein, accuracy in gesture identification may be improved by processing implemented through the gesture identification model acquired based on a neural network model.

Herein, the relative motion parameter for a second-type object of the target objects that has moved may be acquired by filtering out a first-type object of the target objects that has not moved according to the clustering result. Then, a gesture identification result may be acquired by processing the relative motion parameter for the second-type object through a preset gesture identification model. That is, a gesture under detection may be identified.

The clustering result may be acquired by performing clustering association on the target objects based on the relative motion parameter as follows. The clustering result may be acquired by performing, based on a preset clustering algorithm, clustering processing on relative distances and relative speeds corresponding to the target objects.

Herein, a preset clustering algorithm may refer to an algorithm pre-stored in the mobile UE for classifying the target objects. The clustering algorithm may be any clustering algorithm capable of implementing classification, such as a K-means clustering algorithm, an Expectation Maximization (EM) clustering, a hierarchical Agglomerative Clustering algorithm, etc. Target objects in identical states of motion may be classified into one cluster based on a clustering algorithm. Accordingly, multiple clusters may be acquired for multiple distinct states of motion.

Clustering processing may be performed on relative distances and relative speeds corresponding to the target objects as follows. Target objects with identical relative speeds and identical relative distances, or relative speeds and relative distances differing by an amount within a preset range, may be classified into one cluster according to magnitudes of the relative speeds and the relative distances corresponding to the target objects. Herein, the preset range may include a first preset range corresponding to a relative distance, a second preset range corresponding to a relative speed, etc.

For example, it may be detected that an object A of the target objects is moving at a relative speed 10 m/s at a relative distance 3 m to the mobile UE. It may be detected that an object B of the target objects is moving at a relative speed 10 m/s at a relative distance 3.05 m to the mobile UE. The first preset range may be 0 m to 1 m. The second preset range may be 0 m/s to 0.5 m/s. Then, it may be deemed that the object A and the object B are in similar states of motion and are to be classified into one cluster.

With embodiments herein, before a gesture is identified, clustering association may be performed on the target objects to classify target objects in different states of motion, facilitating subsequent filter of interfering data during identification as well as final gesture identification, greatly reducing workload in identification.

The processing module may be further adapted to acquiring the clustering result by performing, based on the preset clustering algorithm, clustering processing on: a result of comparing, to a first threshold, a difference between the relative distances corresponding to the target objects; and a result of comparing, to a second threshold, a difference between the relative speeds corresponding to the target objects.

As mentioned above, target objects in similar or identical states of motion are to be classified into one cluster. It may be determined whether target objects are in similar or identical states of motion based on the result of comparing, to the first threshold, the difference between the relative distances corresponding to the target objects, and the result of comparing, to the second threshold, the difference between the relative speeds corresponding to the target objects.

Herein, the first threshold may refer to the upper limit of the first preset range. That is, the first threshold may be 1 if the first preset range is 0 m to 1 m. The second threshold may refer to the upper limit of the second preset range. That is, the second threshold may be 0.5 if the second preset range is 0-m/s to 0.5 m/s.

The first threshold and the second threshold may be set as needed, such as according to experience, a test values, etc. For example, if it is tested that a difference between relative distances falls in a range, it may be deemed that the two target objects are substantially in similar or identical states of motion.

The clustering result may be acquired by performing, based on the preset clustering algorithm, clustering processing on: the result of comparing, to the first threshold, the difference between the relative distances corresponding to the target objects; and the result of comparing, to the second threshold, the difference between the relative speeds corresponding to the target objects, as follows. After multiple relative speeds and relative distances are acquired, differences between every two of the multiple relative speeds in each detection may be acquired. Differences between every two of the multiple relative distances in each detection may be acquired. Clustering association may be performed on the target objects based on the differences, thereby acquiring the clustering result.

Herein, clustering association may be performed on the target objects based on the differences as follows.

It may be determined whether a difference acquired by subtracting one relative distance from another relative distance falls in the first preset range. It may be determined whether a difference acquired by subtracting one relative speed from another relative speed falls in the second preset range.

Target objects corresponding to the first preset range and the second preset range may be associated with one cluster.

Herein, corresponding target objects may be deemed as associated only if both the difference acquired by subtracting one relative distance from another relative distance and the difference acquired by subtracting one relative speed from another relative speed meet respective preset ranges.

Furthermore, the processing module may be further adapted to determining, according to at least one of relative angles or the relative speeds corresponding to the target objects, the first-type object that has not moved in the clustering result.

The processing module may be further adapted to acquiring the relative motion parameter for the second-type object that has moved by filtering out the first-type object that has not moved based on a preset filter algorithm.

Herein, the first-type object that has not moved in the clustering result may be determined according to at least one of relative angles or the relative speeds corresponding to the target objects as follows.

A first difference between every two of the multiple relative speeds may be acquired. A second difference between every two of the multiple relative angles may be acquired. A target object corresponding to the first difference less than the first threshold and/or the second difference less than a third threshold may be determined as a first-type object that has not moved.

Herein, the first threshold may refer to the upper limit of the first preset range. The third threshold may be used for determining a rotation angle. The third threshold may refer to the upper limit of a third preset range corresponding to the relative angle. Then, a corresponding target object may be determined as a first-type object that has not moved if the first difference between two relative speeds is less than the upper limit of the first preset range, and the second difference between two relative angles is less than the upper limit of the third preset range.

A preset filter algorithm may be an algorithm pre-stored in the mobile UE for filtering out a relative motion parameter meeting a condition. The filter algorithm may be any filter algorithm capable of implementing classification, such as a Kalman filter algorithm, an arithmetic average filter algorithm, etc.

The relative motion parameter for the second-type object that has moved may be acquired by filtering out the first-type object that has not moved based on a preset filter algorithm as follows. The relative motion parameter for the first-type object that has not moved may be determined. Then, the relative motion parameter for the second-type object that has moved may be acquired by filtering out the relative motion parameter for the first-type object that has not moved based on a filter algorithm.

In this way, valid information useful for gesture identification may be extracted by filtering based on a filter algorithm, Then, a gesture may be identified by processing based on the useful information, thereby reducing identification pressure caused by existence of massive invalid data that may interfere.

The processing module may be further adapted to: determining trajectories of motion of the target objects according to the relative motion parameter; and acquiring the gesture identification result by performing machine learning on a trajectory of motion of the second-type object through the preset gesture identification model.

A trajectory of motion may reflect a motion of a target object within a preset time period. For example, a trajectory of motion of a palm may include a trajectory of slide of the palm to the left, to the right, upward, downward, etc.

Herein, a trajectory of motion of a target object may be determined as follows. Multiple relative motion parameters detected by multiple detections may be acquired. Time of detecting the multiple relative motion parameters may be determined. The trajectory of motion of the target object may be determined based on a time sequence of the detections according to the relative motion parameters.

After the relative distance and the relative speed are acquired, a cluster to which the target object belongs may be determined. Target objects in one cluster may be deemed to have identical or similar relative distances and relative speeds and may be deemed as a whole. Therefore, a trajectory of operation of a target object may be determined through relative distances of one target object detected at different times.

Note that the preset gesture identification model may be a gesture identification model pre-trained pre-stored in the mobile UE. Therefore, in historical use of the mobile UE, if a target object has been detected many times and multiple trajectories of motion have been acquired, a gesture identification model may be determined based on the trajectories of motion acquired in the historical use.

Accordingly, herein, a gesture identification model may be determined as follows. A neural network model may be selected. Then, the neural network model may be trained using experimental data to acquire the gesture identification model. The experimental data may include trajectories of motion and gesture identification results corresponding to the trajectories of motion.

The neural network model may be trained using experimental data to acquire the gesture identification model as follows. The trajectories of motion in the experimental data may be input to the neural network model to be trained for iterative processing, until a difference between an output actual gesture identification result and the gesture identification result in the experimental data meets a convergence condition. Then, the gesture identification model may be acquired.

Herein, the difference may meet the convergence condition if the difference is less than a preset value, or is a minimum value of a predicted number of iteration processing.

The gesture identification result may be expressed as similarities to various gestures in practice. That is, trajectories of motion may be input to the neural network model for processing. Similarities to various gestures may be output. A gesture corresponding to a maximum similarity may be selected as the final gesture identification result.

Herein, with mobile UE provided with the radar antenna array according to an embodiment herein, parameters of states of more target objects may be detected more accurately with an increased angular resolution. Trajectories of operation of the target objects may be determined based on the parameters of states. A gesture identification result may be acquired by processing trajectories of motion based on a gesture identification model.

Figure 7:
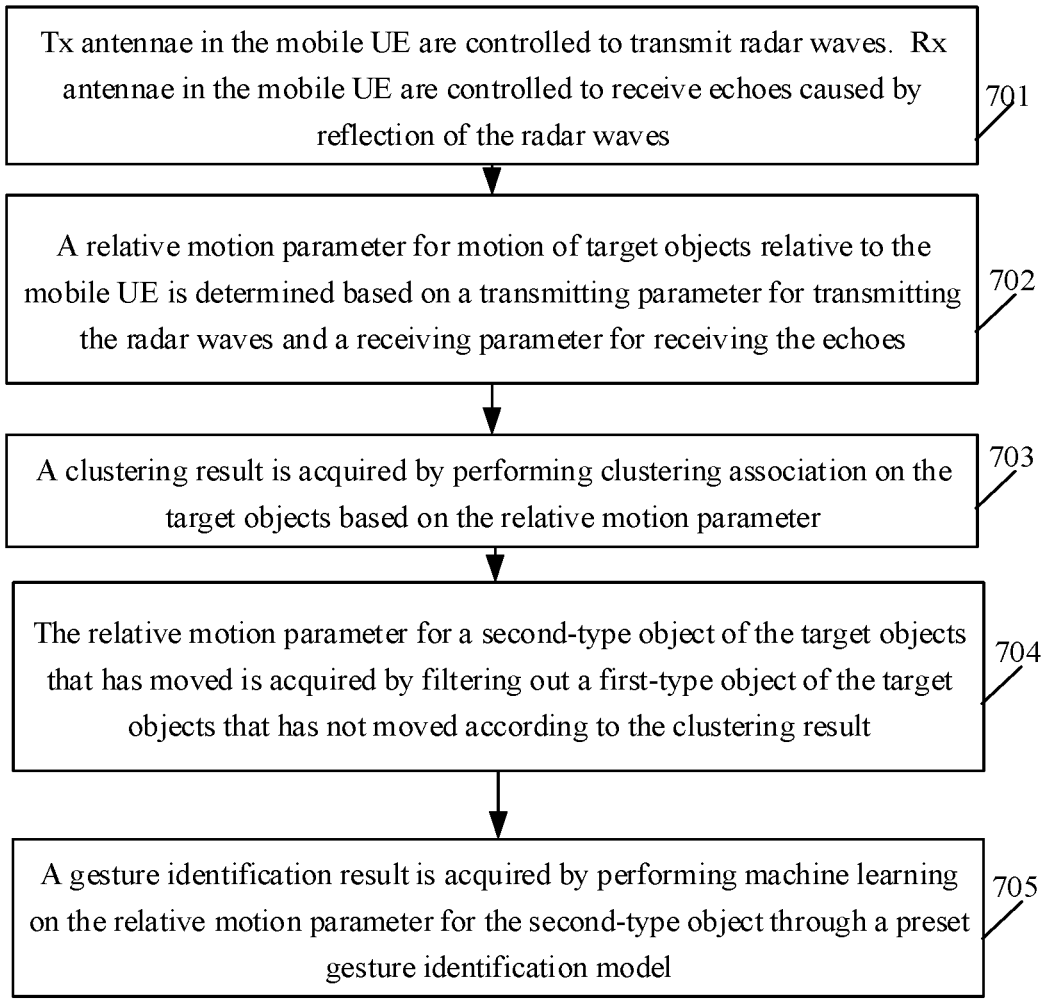
FIG. 7 is a flowchart of a method for identifying a gesture, according to an example of the present disclosure.

Embodiments herein further provide a method for identifying a gesture for implementing accurate detection of multiple target objects. The method is applicable to the mobile UE herein. FIG. 7 is a flowchart of a method for identifying a gesture according to an embodiment. As shown in FIG. 7, the method includes an option as follows.

In option 701, Tx antennae in the mobile UE are controlled to transmit radar waves. Rx antennae in the mobile UE are controlled to receive echoes caused by reflection of the radar waves.

In option 702, a relative motion parameter for motion of target objects relative to the mobile UE is determined based on a transmitting parameter for transmitting the radar waves and a receiving parameter for receiving the echoes.

In option 703, a clustering result is acquired by performing clustering association on the target objects based on the relative motion parameter.

In option 704, the relative motion parameter for a second-type object of the target objects that has moved is acquired by filtering out a first-type object of the target objects that has not moved according to the clustering result.

In option 705, a gesture identification result is acquired by performing machine learning on the relative motion parameter for the second-type object through a preset gesture identification model.

Herein, options 702 to 705 may be implemented by the processing module in the mobile UE herein.

The relative motion parameter may include at least one of a relative speed, a relative angle, or a relative distance.

The clustering result may be acquired by performing clustering association on the target objects based on the relative motion parameter as follows.

The clustering result may be acquired by performing, based on a preset clustering algorithm, clustering processing on relative distances and relative speeds corresponding to the target objects.

The clustering result may be acquired by performing, based on the preset clustering algorithm, clustering processing on relative distances and relative speeds corresponding to the target objects as follows.

The clustering result may be acquired by performing, based on the preset clustering algorithm, clustering processing on: a result of comparing, to a first threshold, a difference between the relative distances corresponding to the target objects; and a result of comparing, to a second threshold, a difference between the relative speeds corresponding to the target objects.

The relative motion parameter for the second-type object of the target objects that has moved may be acquired by filtering out the first-type object of the target objects that has not moved according to the clustering result as follows.

The first-type object that has not moved in the clustering result may be determined according to at least one of relative angles or the relative speeds corresponding to the target objects.

The relative motion parameter for the second-type object that has moved may be acquired by filtering out the first-type object that has not moved based on a preset filter algorithm.

The method may further include an option as follows.

Trajectories of motion of the target objects may be determined according to the relative motion parameter.

The gesture identification result may be acquired by performing machine learning on the relative motion parameter for the second-type object through the preset gesture identification model as follows.

The gesture identification result may be acquired by performing machine learning on a trajectory of motion of the second-type object through the preset gesture identification model.

With embodiments herein, based on a radar antenna array provided in mobile UE, parameters of states of more target objects may be detected more accurately with an increased angular resolution. Trajectories of motion of the target objects may be determined based on the parameters of states. A gesture may be identified by processing the trajectories of motion based on a gesture identification model. Accordingly, more than one target object may be detected. Multiple target objects may be detected more accurately.

Implementation of a method herein has been elaborated in at least one embodiment of a device herein, which will not be repeated here.

Figure 8:
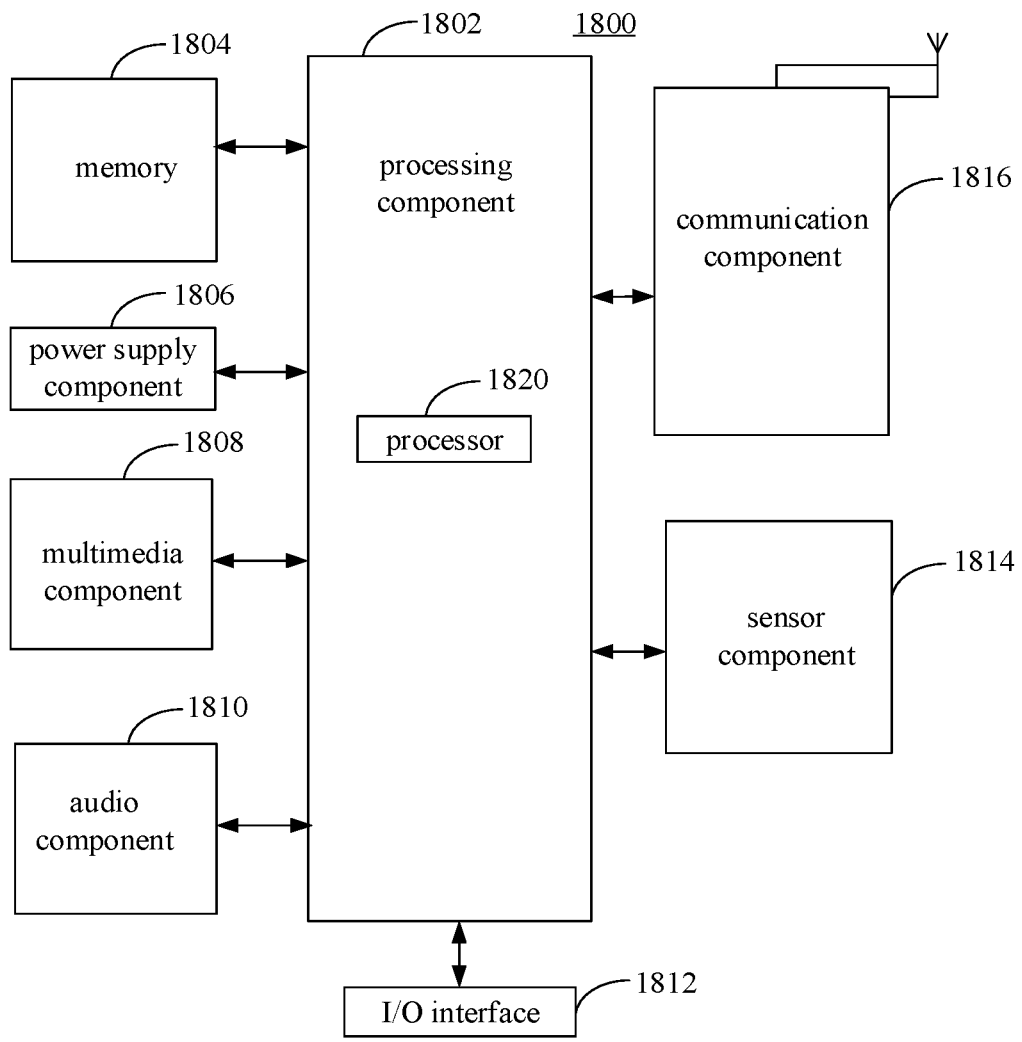
FIG. 8 is a block diagram of a device for identifying a gesture, according to an example of the present disclosure.

FIG. 8 is a block diagram of a device 1800 for identifying a gesture according to an embodiment. For example, the device 1800 may be UE such as a mobile phone, a computer, digital broadcast UE, messaging equipment, a gaming console, tablet equipment, medical equipment, fitness equipment, a personal digital assistant, etc.

Referring to FIG. 8, the device 1800 may include at least one of a processing component 1802, memory 1804, a power supply component 1806, a multimedia component 1808, an audio component 1810, an Input/Output (I/O) interface 1812, a sensor component 1814, a communication component 1816, etc.

The processing component 1802 may generally control an overall operation of the device 1800, such as operations associated with display, a telephone call, data communication, a camera operation, a recording operation, etc. The processing component 1802 may include one or more processors 1820 to execute instructions so as to complete all or a part of an aforementioned method. In addition, the processing component 1802 may include one or more modules to facilitate interaction between the processing component 1802 and other components. For example, the processing component 1802 may include a multimedia portion to facilitate interaction between the multimedia component 1808 and the processing component 1802.

The memory 1804 may be adapted to storing various types of data to support the operation at the device 1800. Examples of such data may include instructions of any APP or method adapted to operating on the device 1800, contact data, phonebook data, messages, pictures, videos, etc. The memory 1804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1806 may supply electric power to various components of the device 1800. The power supply component 1806 may include a power management system, one or more power sources, and other components related to generating, managing, and distributing electricity for the device 1800.

The multimedia component 1808 may include a screen that provides an output interface between the device 1800 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1808 may include at least one of a front camera or a rear camera. When the device 1800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1810 may be adapted to outputting and/or inputting an audio signal. For example, the audio component 1810 may include a microphone (MIC). When the device 1800 is in an operation mode such as a call mode, a recording mode, a voice recognition mode, etc., the MIC may be adapted to receiving an external audio signal. The received audio signal may be further stored in the memory 1804 or may be sent via the communication component 1816. The audio component 1810 may further include a loudspeaker adapted to outputting the audio signal.

The I/O interface 1812 may provide an interface between the processing component 1802 and a peripheral interface portion. Such a peripheral interface portion may be a keypad, a click wheel, a button, etc. Such a button may include but is not limited to at least one of a homepage button, a volume button, a start button, or a lock button.

The sensor component 1814 may include one or more sensors for assessing various states of the device 1800. For example, the sensor component 1814 may detect an on/off state of the device 1800 and relative positioning of components such as the display and the keypad of the device 1800. The sensor component 1814 may further detect a change in the location of the device 1800 or of a component of the device 1800, whether there is contact between the device 1800 and a user, the orientation or acceleration/deceleration of the device 1800, a change in the temperature of the device 1800, etc. The sensor component 1814 may include a proximity sensor adapted to detecting existence of a nearby object without physical contact. The sensor component 1814 may further include an optical sensor such as a Complementary Metal-Oxide-Semiconductor (CMOS) or a Charge-Coupled-Device (CCD) image sensor used in an imaging APP. The sensor component 1814 may further include an acceleration sensor, a gyroscope sensor, a magnetic sensor, a pressure sensor, a temperature sensor, etc.

The communication component 1816 may be adapted to facilitating wired or wireless communication between the device 1800 and other equipment. The device 1800 may access a wireless network based on a communication standard such as Wi-Fi, 2G, 3G . . . , or a combination thereof. The communication component 1816 may broadcast related information or receive a broadcast signal from an external broadcast management system via a broadcast channel. The communication component 1816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In one or more embodiments, the device 1800 may be realized by one or more electronic components such as an APP Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In one or more embodiments, a transitory or non-transitory computer-readable storage medium including instructions, such as memory 1804 including instructions, may be provided. The instructions may be executed by the processor 1820 of the device 1800 to implement the method. For example, the transitory or non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A transitory or non-transitory computer-readable storage medium has stored thereon instructions which, when executed by a processor of a device for identifying a gesture, enable the device to implement a method for identifying a gesture herein.

Further note that herein by "multiple," it may mean two or more. Other quantifiers may have similar meanings. A term "and/or" may describe an association between associated objects, indicating three possible relationships. For example, by A and/or B, it may mean that there may be three cases, namely, existence of but A, existence of both A and B, or existence of but B. A slash mark "/" may generally denote an "or" relationship between two associated objects that come respectively before and after the slash mark. Singulars "a/an," "said," and "the" are intended to include the plural form, unless expressly illustrated otherwise by context.

Further note that although a term such as first, second, etc., may be adopted to describe various kinds of information, such information should not be limited to such a term. Such a term is merely for distinguishing information of the same type, without indicating any specific or der or degree of importance. In fact, expressions such as "first," "second," etc., are completely interchangeable in usage. For example, without departing from the scope of embodiments herein, first information may also be referred to as second information. Similarly, second information may also be referred to as first information.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be examples only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A radar antenna array, applied to mobile User Equipment (UE), the radar antenna array comprising:
   a transmit (Tx) antenna array located on a horizontal line and configured to transmit radar waves; and
   a receive (Rx) antenna array comprising horizontal Rx antennae arranged along a horizontal dimension and/or pitch Rx antennae arranged along a pitch dimension, wherein the horizontal dimension and the pitch dimension are perpendicular to each other,
   wherein the Rx antenna array is configured to receive echoes caused by reflection of the radar waves, wherein the horizontal Rx antennae are located on the horizontal line where the Tx antenna array is located, wherein the pitch dimension is perpendicular to the horizontal line, and wherein a transmitting parameter for transmitting the radar waves and a receiving parameter for receiving the echoes are used at least for identifying a gesture within a radiation range covered by the radar waves.

2. The radar antenna array of claim 1, wherein a distance between two adjacent Tx antennae of the Tx antenna array is half a wavelength of the radar waves, wherein a distance between two adjacent horizontal Rx antennae is the wavelength of the radar waves, and wherein a distance between two adjacent pitch Rx antennae is half the wavelength of the radar waves.

3. The radar antenna array of claim 1, wherein the Tx antenna array comprises two Tx antennae, wherein the horizontal Rx antennae comprise two horizontal Rx antennae including an outermost horizontal Rx antenna, wherein the pitch Rx antennae comprise two adjacent pitch Rx antennae including a closer pitch Rx antenna, wherein a distance between the outermost horizontal Rx antenna and the closer pitch Rx antenna equals a distance between the two adjacent pitch Rx antennae, wherein the outermost horizontal Rx antenna is located at an outermost side of the horizontal line, wherein the outermost horizontal Rx antenna is closer to the two adjacent pitch Rx antennae than the other horizontal Rx antenna is, wherein the outermost horizontal Rx antenna is located on one line as the two adjacent pitch Rx antennae, wherein the outermost horizontal Rx antenna is closer to the closer pitch Rx antenna than is to the other pitch Rx antenna.

4. The radar antenna array of claim 2, wherein the Tx antenna array comprises two Tx antennae, wherein the horizontal Rx antennae comprise two horizontal Rx antennae including an outermost horizontal Rx antenna, wherein the pitch Rx antennae comprise two adjacent pitch Rx antennae including a closer pitch Rx antenna, wherein a distance between the outermost horizontal Rx antenna and the closer pitch Rx antenna equals a distance between the two adjacent pitch Rx antennae, wherein the outermost horizontal Rx antenna is located at an outermost side of the horizontal line, wherein the outermost horizontal Rx antenna is closer to the two adjacent pitch Rx antennae than the other horizontal Rx antenna is, wherein the outermost horizontal Rx antenna is located on one line as the two adjacent pitch Rx antennae, wherein the outermost horizontal Rx antenna is closer to the closer pitch Rx antenna than is to the other pitch Rx antenna.

5. Mobile User Equipment (UE), comprising:

a transmit (Tx) antenna array located on a horizontal line and configured to transmit radar waves; and a receive (Rx) antenna array comprising horizontal Rx antennae arranged along a horizontal dimension and/or pitch Rx antennae arranged along a pitch dimension, wherein the horizontal dimension and the pitch dimension are perpendicular to each other, wherein the Rx antenna array is configured to receive echoes caused by reflection of the radar waves, wherein the horizontal Rx antennae are located on the horizontal line where the Tx antenna array is located, wherein the pitch dimension is perpendicular to the horizontal line, and wherein a transmitting parameter for transmitting the radar waves and a receiving parameter for receiving the echoes are used at least for identifying a gesture within a radiation range covered by the radar waves; and a processing circuit connected to the Tx antenna array and the Rx antenna array in a radar antenna array, wherein the processing circuit is configured to:

determine, based on the transmitting parameter for transmitting the radar waves by the Tx antenna array and the receiving parameter for receiving the echoes by the Rx antenna array, a relative motion parameter for motion of target objects relative to the mobile UE;

acquire a clustering result by performing clustering association on the target objects based on the relative motion parameter;

acquire the relative motion parameter for a second-type object of the target objects that has moved by filtering out a first-type object of the target objects that has not moved according to the clustering result; and acquire a gesture identification result by performing machine learning on the relative motion parameter for the second-type object through a preset gesture identification model.

6. The mobile UE of claim 5, wherein the relative motion parameter comprises at least one of a relative speed, a relative angle, or a relative distance, wherein the processing circuit is further configured to acquire the clustering result by performing, based on a preset clustering algorithm, clustering processing on relative distances and relative speeds corresponding to the target objects.

7. The mobile UE of claim 6, wherein the processing circuit is further configured to acquire the clustering result by performing, based on the preset clustering algorithm, clustering processing on:

a result of comparing, to a first threshold, a difference between the relative distances corresponding to the target objects; and a result of comparing, to a second threshold, a difference between the relative speeds corresponding to the target objects.

8. The mobile UE of claim 6, wherein the processing circuit is further configured to:

determine, according to at least one of relative angles or the relative speeds corresponding to the target objects, the first-type object that has not moved in the clustering result; and acquire the relative motion parameter for the second-type object that has moved by filtering out the first-type object that has not moved based on a preset filter algorithm.

9. The mobile UE of claim 5, wherein the processing circuit is further configured to:

determine trajectories of motion of the target objects according to the relative motion parameter; and acquire the gesture identification result by performing machine learning on a trajectory of motion of the second-type object through the preset gesture identification model.

10. A method for identifying a gesture, applied to mobile User Equipment (UE), the method comprising:

controlling Tx antennae in the mobile UE to transmit radar waves;

controlling Rx antennae in the mobile UE to receive echoes caused by reflection of the radar waves;

determining, based on a transmitting parameter for transmitting the radar waves and a receiving parameter for receiving the echoes, a relative motion parameter for motion of target objects relative to the mobile UE;

acquiring a clustering result by performing clustering association on the target objects based on the relative motion parameter;

acquiring the relative motion parameter for a second-type object of the target objects that has moved by filtering out a first-type object of the target objects that has not moved according to the clustering result; and acquiring a gesture identification result by performing machine learning on the relative motion parameter for the second-type object through a preset gesture identification model.

11. The method of claim 10, wherein the relative motion parameter comprises at least one of a relative speed, a relative angle, or a relative distance, wherein acquiring the clustering result by performing clustering association on the target objects based on the relative motion parameter comprises:

acquiring the clustering result by performing, based on a preset clustering algorithm, clustering processing on relative distances and relative speeds corresponding to the target objects.

12. The method of claim 11, wherein acquiring the clustering result by performing, based on the preset clustering algorithm, clustering processing on the relative distances and the relative speeds corresponding to the target objects comprises:

acquiring the clustering result by performing, based on the preset clustering algorithm, clustering processing on:

a result of comparing, to a first threshold, a difference between the relative distances corresponding to the target objects; and a result of comparing, to a second threshold, a difference between the relative speeds corresponding to the target objects.

13. The method of claim 11, wherein acquiring the relative motion parameter for the second-type object of the target objects that has moved by filtering out the first-type object of the target objects that has not moved according to the clustering result comprises:

determining, according to at least one of relative angles or the relative speeds corresponding to the target objects, the first-type object that has not moved in the clustering result; and acquiring the relative motion parameter for the second-type object that has moved by filtering out the first-type object that has not moved based on a preset filter algorithm.

14. The method of claim 10, further comprising:
determining trajectories of motion of the target objects according to the relative motion parameter, wherein acquiring the gesture identification result by performing machine learning on the relative motion parameter for the second-type object through the preset gesture identification model comprises:

acquiring the gesture identification result by performing machine learning on a trajectory of motion of the second-type object through the preset gesture identification model.

15. A computing device comprising:
one or more processors; and a non-transitory computer-readable storage medium storing instructions executable by the one or more processors, wherein the one or more processors are configured to:

control Tx antennae in mobile User Equipment (UE) to transmit radar waves;

control Rx antennae in the mobile UE to receive echoes caused by reflection of the radar waves;

determine, based on a transmitting parameter for transmitting the radar waves and a receiving parameter for receiving the echoes, a relative motion parameter for motion of target objects relative to the mobile UE;

acquire a clustering result by performing clustering association on the target objects based on the relative motion parameter;

acquire the relative motion parameter for a second-type object of the target objects that has moved by filtering out a first-type object of the target objects that has not moved according to the clustering result; and acquire a gesture identification result by performing machine learning on the relative motion parameter for the second-type object through a preset gesture identification model.

16. The device of claim 15, wherein the one or more processors are further configured to:

acquire the clustering result by performing, based on a preset clustering algorithm, clustering processing on relative distances and relative speeds corresponding to the target objects, wherein the relative motion parameter comprises at least one of a relative speed, a relative angle, or a relative distance.

17. The device of claim 16, wherein the one or more processors are further configured to:

acquire the clustering result by performing, based on the preset clustering algorithm, clustering processing on:

a result of comparing, to a first threshold, a difference between the relative distances corresponding to the target objects; and a result of comparing, to a second threshold, a difference between the relative speeds corresponding to the target objects.

18. The device of claim 16, wherein the one or more processors are further configured to:

determine, according to at least one of relative angles or the relative speeds corresponding to the target objects, the first-type object that has not moved in the clustering result; and acquire the relative motion parameter for the second-type object that has moved by filtering out the first-type object that has not moved based on a preset filter algorithm.

19. The device of claim 15, wherein the one or more processors are further configured to:

determine trajectories of motion of the target objects according to the relative motion parameter; and acquire the gesture identification result by performing machine learning on a trajectory of motion of the second-type object through the preset gesture identification model.

* * * * *